(12) United States Patent
Lee et al.

(10) Patent No.: US 7,346,339 B2
(45) Date of Patent: Mar. 18, 2008

(54) TRANSMITTING AND RECEIVING NOTIFICATION OF CONTROL INFORMATION FOR POINT TO MULTIPOINT SERVICE IN WIRELESS COMMUNICATION SYSTEM

(75) Inventors: Young Dae Lee, Kyoungki-do (KR); Sung Duck Chun, Anyang (KR); Seung June Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 154 days.

(21) Appl. No.: 11/121,860

(22) Filed: May 4, 2005

(65) Prior Publication Data

US 2005/0255836 A1    Nov. 17, 2005

(30) Foreign Application Priority Data

May 6, 2004    (KR) ............................. 2004-0031897

(51) Int. Cl.
*H04M 3/42* (2006.01)
*H04Q 7/22* (2006.01)
*H04Q 7/38* (2006.01)

(52) U.S. Cl. .................. 455/414.1; 455/450; 370/312; 370/432

(58) Field of Classification Search ................ 455/411, 455/450, 458, 511; 370/312, 432, 431
See application file for complete search history.

(56) References Cited

U.S. PATENT DOCUMENTS 6,256,509 B1    7/2001   Tanaka
6,452,644 B1    9/2002   Shimakawa
2002/0181423 A1  12/2002  Chen et al.
2003/0157953 A1  8/2003   Das
2004/0008679 A1  1/2004   Sinnarajah et al.

FOREIGN PATENT DOCUMENTS

EP    1 372 350 A1    12/2003

OTHER PUBLICATIONS

Shun-Ren Yang; Yi-Bing Lin; "Modeling UTMS Discontinuous Reception Mechanism", Wireless Communications, IEEE Transaction on, vol. 4, Issue 1, Jan. 2005, pp. 312-319).*
3GPP TS 25.346 V1.5.0. (Mar. 2003), Technical Report, 3rd Generation Partnership Project; Technical Specification Group Radio Access Network; Introduction of the Multimedia Broadcast Service (MBMS) in the Radio Access Network (Stage-2); (Release 6).*
3GPP TS 25.346 V2.6.0. (Feb. 2004), Technical Report, 3rd Generation Partnership Project; Technical Specification Group Radio Access Network; Introduction of the Multimedia Broadcast Service (MBMS) in the Radio Access Network (Stage-2); (Release 6).*

* cited by examiner

Primary Examiner—Lester G. Kincaid
Assistant Examiner—Sylvia Mack
(74) Attorney, Agent, or Firm—Lee, Hong, Degerman, Kang & Schmadeka

(57) ABSTRACT

The present invention relates to transmitting and receiving a notification of control information for a point-to-multipoint service. Preferably, a mobile terminal receives notification information from a network during a first period. The mobile terminal then determines to receive a control channel during a second period for receiving a control information message according to the notification information. After, the mobile terminal receives the control information message for the point-to-multipoint service during the second period if the mobile terminal determines to receive the control information message during the second period.

23 Claims, 8 Drawing Sheets

TRANSMITTING AND RECEIVING NOTIFICATION OF CONTROL INFORMATION FOR POINT TO MULTIPOINT SERVICE IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 2004-0031897, filed on May 6, 2004, the contents of which is hereby incorporated by reference herein in its entirety.

FIELD OF THE INVENTION

The present invention relates to a point-to-multipoint service in a mobile communication system, and more particularly, to transmitting and receiving a notification of control information for a point-to-multipoint service.

BACKGROUND OF THE INVENTION

A universal mobile telecommunications system (UMTS) is a third-generation mobile communications system evolving from a global system for mobile communications system (GSM), which is the European standard. The UMTS is aimed at providing enhanced mobile communications services based on the GSM core network and wideband code-division multiple-access technologies.

A related art UMTS network structure 1 is illustrated in FIG. 1. As shown, a mobile terminal, or user equipment (UE) 2 is connected to a core network (CN) 4 through a UMTS terrestrial radio access network (UTRAN) 6. The UTRAN 6 configures, maintains and manages a radio access bearer for communications between the UE 2 and the core network 4 to meet end-to-end quality of service requirements.

The UTRAN 6 includes a plurality of radio network subsystems (RNS) 8, each of which comprises one radio network controller (RNC) 10 for a plurality base stations, or Node Bs 12. The RNC 10 connected to a given base station 12 is the controlling RNC for allocating and managing the common resources provided for any number of UEs 2 operating in one cell. One or more cells exist in one Node B. The controlling RNC 10 controls traffic load, cell congestion, and the acceptance of new radio links. Each Node B 12 may receive an uplink signal from a UE 2 and may transmit a downlink signals to the UE 2. Each Node B 12 serves as an access point enabling a UE 2 to connect to the UTRAN 6, while an RNC 10 serves as an access point for connecting the corresponding Node Bs to the core network 4.

Among the radio network subsystems 8 of the UTRAN 6, the serving RNC 10 is the RNC managing dedicated radio resources for the provision of services to a specific UE 2 and is the access point to the core network 4 for data transfer to the specific UE. All other RNCs 10 connected to the UE 2 are drift RNCs, such that there is only one serving RNC connecting the UE to the core network 4 via the UTRAN 6. The drift RNCs 10 facilitate the routing of user data and allocate codes as common resources.

The interface between the UE 2 and the UTRAN 6 is realized through a radio interface protocol established in accordance with radio access network specifications describing a physical layer (L1), a data link layer (L2) and a network layer (L3) described in, for example, 3GPP specifications. These layers are based on the lower three layers of an open system interconnection (OSI) model that is a well-known in communications systems.

A related art architecture of the radio interface protocol is illustrated in FIG. 2. As shown, the radio interface protocol is divided horizontally into a physical layer, a data link layer, and a network layer, and is divided vertically into a user plane for carrying data traffic such as voice signals and Internet protocol packet transmissions and a control plane for carrying control information for the maintenance and management of the interface.

The physical layer (PHY) provides information transfer service to a higher layer and is linked via transport channels to a medium access control (MAC) layer. Data travels between the MAC layer and the physical layer via a transport channel. Also, data transmission is performed through a physical channel between different physical layers, namely, between physical layers of a sending side (transmitter) and a receiving side (receiver).

The MAC layer of the second layer (L2) provides information transfer service to a higher layer and is linked via a logical channel to a radio link control (RLC) layer. The RLC layer of the second layer (L2) supports the transmission of reliable data and can perform segmentation and concatenation functions for RLC service data units (SDU) received from an upper layer.

A radio resource control (RRC) layer located at the lowest portion of the third layer (L3) is only defined in the control plane and controls transport channels and physical channels with respect to the establishment, re-establishment, and release of radio bearers. A radio bearer (RB) is a service provided by a lower layer, such as the RLC layer or the MAC layer, for transferring data between the UE 2 and the UTRAN 6.

The establishment of an RB determines regulating characteristics of the protocol layer and channel needed to provide a specific service, thereby establishing the parameters and operational methods of the service. When a connection is established to allow transmission between an RRC layer of a specific UE 2 and an RRC layer of the UTRAN 6, the UE 2 is said to be in the RRC-connected state. Without such connection, the UE 2 is in an idle state.

Hereafter, a Multimedia Broadcast/Multicast Service (MBMS or "MBMS service") will be described. MBMS refers to a method of providing streaming or background services to a plurality of UEs 2 using a downlink-dedicated MBMS radio bearer that utilizes at least one of point-to-multipoint and point-to-point radio bearer. One MBMS service includes one or more sessions and MBMS data is transmitted to the plurality of terminals through the MBMS radio bearer only while the session is ongoing.

As the name implies, an MBMS may be carried out in a broadcast mode or a multicast mode. The broadcast mode is for transmitting multimedia data to all UEs 2 within a broadcast area, for example the domain where the broadcast is available. The multicast mode is for transmitting multimedia data to a specific UE 2 group within a multicast area, for example the domain where the multicast service is available.

The UTRAN 6 provides the MBMS service to the UEs 2 using the RB. RBs used by the UTRAN 6 can be classified as a point-to-point RB or a point-to-multipoint RB. The point-to-point RB is a bi-directional RB, including a logical channel DTCH (Dedicated Traffic Channel), a transport channel DCH (Dedicated Channel) and a physical channel DPCH (Dedicated Physical Channel) or SCCPCH (Secondary Common Control Physical Channel).

The point-to-multipoint RB is a uni-directional downlink RB, including a logical channel MTCH (MBMS Traffic Channel), a transport channel FACH (Forward Access Channel), and the physical channel SCCPCH, as shown in FIG. 3. The logical channel MTCH is configured for each MBMS service provided to one cell and used to transmit user plane data of a specific MBMS service to the UEs 2.

The UTRAN 6 providing the MBMS service transmits MBMS-related control information to the plurality of terminals (UEs 2) through an MCCH (MBMS Control Channel). Herein, the logical channel MCCH is the point-to-multipoint downlink channel and is mapped to the FACH, which is mapped to the SCCPCH. The MBMS-related control information includes a session start for indicating the start of an MBMS service, a session stop for indicating the end of the MBMS service, an RB type indicator for indicating whether the MBMS service is provided via a point-to-point RB or a point-to-multipoint RB, RB information for providing point-to-multipoint RB information such as the MTCH if the RB is a point-to-multipoint RB, counting information for measuring the number of terminals desiring to receive the MBMS service, and re-counting information for re-counting the number of terminals desiring the MBMS service while the MBMS service is being provided.

FIG. 3 illustrates channel mapping for an MBMS of a UE side. The MBMS-related control information may be included in an independent message and transmitted, or can be entirely included in one MBMS control message. To transmit various control information related to the MBMS service, the logical channel MCCH is used. Channel mapping of the MCCH is similar to that of the MTCH. Namely, the MCCH is a point-to-multipoint downlink channel and is mapped to the transport channel FACH, which is mapped to the physical channel SCCPCH. For reference, only one MTCH is provided for one service, while only one MCCH is provided for one cell.

The terminal (UE) 2 wishing to receive an MBMS service, must first receive MBMS control information through the MCCH. However, because the terminal 2 can receive only one SCCPCH for the MBMS, and the MCCH is transmitted through a different SCCPCH irrelative to the MTCH, the terminal cannot receive the MCCH if the terminal has already received one or more MBMS services.

FIG. 4 illustrates a related art method for transmitting MCCH information. The MCCH information is periodically transmitted according to a modification period and a repetition period. Furthermore, the MCCH information is divided into critical information and non-critical information. The non-critical information may be easily modified during each modification period and repetition period to be transmitted. However, the critical information may be modified only during each modification period to be transmitted. As such, the critical information may be repeatedly transmitted once per repetition period; however, modified critical information may be transmitted only at a beginning point of the modification period.

A UE desiring to receive a specific MBMS service using a point-to-multipoint RB receives the MCCH information including RB information through an MCCH channel. The UE then establishes the point-to-multipoint RB using the MCCH information. Once the point-to-multipoint RB is established, the UE continues to receive a physical channel SCCPCH, to which an MTCH is mapped, to obtain specific MBMS service data transmitted through the MTCH.

FIG. 5 is an example of a transmission of discontinuous MBMS data, scheduling information and a Secondary Notification Indicator (SNI) through a physical channel SCCPCH. The UTRAN can discontinuously transmit MBMS data through an MTCH. At the same time, the UTRAN can periodically transmit scheduling information to the UE through an SCCPCH to which the MTCH is mapped. Here, the scheduling information notifies the UE of a transmission interval of the MBMS service transmitted during one scheduling period. Previously, the UTRAN notified the UE of a transmission period of the scheduling information, namely, the scheduling period, to allow the UE to receive the scheduling information. Therefore, once the UE has obtained the scheduling period from the UTRAN, the UE then receives the scheduling information according to the obtained scheduling period. The UE also discontinuously receives the SCCPCH to which the MTCH is mapped by using the received scheduling information.

Still referring to FIG. 5, while the MTCH for a specific MBMS service is established, the UTRAN can transmit a secondary notification indicator (SNI) to the UE through the SCCPCH to which the MTCH is mapped. When MCCH information for a certain MBMS service is transmitted through the MCCH, the SNI notifies the MCCH information transmission to the UE receiving a corresponding MTCH. In other words, when the MCCH information to be transmitted through the MCCH exists, the UTRAN transmits the SNI to the UE through the SCCPCH to which the MTCH is mapped. Therefore, the UE first receives the SNI through the SCCPCH and then receives the MCCH according to an indication of the SNI. The UE then receives the MCCH information through the MCCH. The SNI can be transmitted or received through the MTCH or through another logical channel mapped to the SCCPCH together with the MTCH.

However, in the related art, the UE cannot recognize when the SNI is to be transmitted. For instance, as shown in FIG. 4, when the UE discontinuously receives the SCCPCH to which the MTCH is mapped according to the scheduling information, only a transmission interval of the MBMS data is notified by the scheduling information. As a result, the UE receives the SCCPCH only during an interval that the MBMS service is transmitted.

Therefore, the UE discontinuously receiving the SCCPCH to which the MTCH is mapped may not receive the SNI. When the SNI is not received, the corresponding UE may not receive a notification message, which the UTRAN transmits through the MCCH.

SUMMARY OF THE INVENTION

The present invention is directed to transmitting and receiving a notification of control information for a point-to-multipoint service.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for receiving a point-to-multipoint service in a mobile terminal of a wireless communication system, the method comprising receiving notification information from a network during a first period, wherein the notification information is received by a plurality of mobile terminals subscribing to at least one point-to-multipoint service, determining to receive a control channel during a second period for receiving a control information message according to the notification information, and receiving the control information message for the point-to-multipoint service during the second period if the mobile terminal determines to receive the control information message during the second period.

Preferably, the notification information is periodically received during a specific time interval. The first period is a modification period. The second period is a subsequent modification period.

In one aspect of the present invention, the step of determining to receive the control channel during the second period for receiving a control information message according to the notification information comprises determining whether the notification information indicates that a mobile terminal subscribing to the point-to-multipoint service should receive the control information message during the second period.

Preferably, the control channel is MCCH. The control information message is received periodically. The notification information is received on a physical channel SCCPCH carrying MTCH.

In another aspect of the present invention, the method further comprises receiving scheduling information from the network for receiving the notification information and receiving the notification information according to the scheduling information. The scheduling information is received periodically. A reception point of the notification information within a scheduling period is not constant. Preferably, the method also comprises discontinuously receiving the SCCPCH carrying MTCH according to the scheduling information.

In accordance with another embodiment of the present invention, a method for transmitting a point-to-multipoint service from a network of a wireless communication system comprises transmitting notification information during a first period, wherein the notification information is provided to a plurality of mobile terminals subscribing to at least one point-to-multipoint service, the notification information comprising an indication for the reception of a control channel during a second period for receiving a control information message in a mobile terminal and transmitting the control information message for the point-to-multipoint service during the second period.

Preferably, the notification information is periodically transmitted during a specific time interval. The first period is a modification period. The second period is a subsequent modification period. The control channel is MCCH. The control information message is transmitted periodically. The notification information is transmitted on a physical channel SCCPCH carrying MTCH.

In one aspect of the present invention, the method further comprises transmitting scheduling information to the mobile terminal for the reception of the notification information and transmitting the notification information according to the scheduling information. The scheduling information is transmitted periodically. A transmission point of the notification information within a scheduling period is not constant. Preferably, the method also comprises discontinuously transmitting the SCCPCH carrying MTCH according to the scheduling information.

In accordance with another embodiment of the present invention, a mobile terminal for receiving a point-to-multipoint service in a wireless communication system comprises means for receiving notification information from a network during a first period, wherein the notification information is received by a plurality of mobile terminals subscribing to at least one point-to-multipoint service, means for determining to receive a control channel during a second period for receiving a control information message according to the notification information, and means for receiving the control information message for the point-to-multipoint service during the second period if the mobile terminal determines to receive the control information message during the second period.

Preferably, the notification information is periodically received during a specific time interval. The first period is a modification period. The second period is a subsequent modification period.

In one aspect of the present invention, the means for determining to receive the control channel during the second period for receiving a control information message according to the notification information comprises means for determining whether the notification information indicates that a mobile terminal subscribing to the point-to-multipoint service should receive the control information message during the second period.

Preferably, the control channel is MCCH. The control information message is received periodically. The notification information is received on a physical channel SCCPCH carrying MTCH.

In another aspect of the invention, the mobile terminal further comprises means for receiving scheduling information from the network for receiving the notification information and means for receiving the notification information according to the scheduling information. The scheduling information is received periodically. A reception point of the notification information within a scheduling period is not constant. Preferably, the mobile terminal also comprises means for discontinuously receiving the SCCPCH carrying MTCH according to the scheduling information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to transmitting and receiving a notification of control information for a point-to-multipoint service.

Reference will now be made in detail to the preferred embodiments of the present invention, examples of which are illustrated in the accompanying drawings. The present invention is embodied in a mobile communication system, such as a UMTS (Universal Mobile Telecommunications system). However, the present invention can be applied to communication systems, which may be operated according to other specifications.

In accordance with one embodiment of the present invention, a method is provided for when MBMS data is discontinuously transmitted, a UE or mobile terminal can receive a notification indicator, such as a secondary notification indicator, and efficiently receive a physical channel, such as an SCCPCH, to which a logical channel, such as an MTCH, is mapped.

For this purpose, network transmits MBMS control information through a first physical channel and a notification indicator through a second physical channel, wherein the notification indicator indicates the existence of specific MBMS service data and MBMS control information. The network transmits the notification indicator during a designated time interval every certain period. Then, the mobile terminal receives the MBMS control information through the first physical channel and the specific MBMS service data and the notification indicator through the second physical channel. During this procedure, the mobile terminal receives the notification indicator during a designated time interval every certain period.

Preferably, the network transmits a transmission period of the notification indicator to the mobile terminal before transmitting the notification indicator. Specifically, the network transmits a period wherein the notification indicator is transmitted to the mobile terminal through a logical channel, such as an MCCH or BCCH, before transmitting the specific MBMS service data.

Preferably, the MBMS control information is transmitted periodically. The notification indicator indicates whether the mobile terminal, subscribed to the specific MBMS service, should receive the MBMS control information expected to be transmitted at a subsequent period. That is, the notification indicator indicates whether the MBMS control information for the specific MBMS service is to be modified at the subsequent period. Therefore, when the MBMS control information is modified at the subsequent period, the mobile terminal subscribed to the specific MBMS service receives the corresponding MBMS control information.

Preferably, the notification indicator is transmitted through a logical channel, such as an MTCH, or through another logical channel mapped together with the MTCH to a physical channel, such as an SCCPCH. The other logical channel may be a Secondary MCCH (S-MCCH), which is a logical channel used for transmitting the notification indicator.

Figure 1:
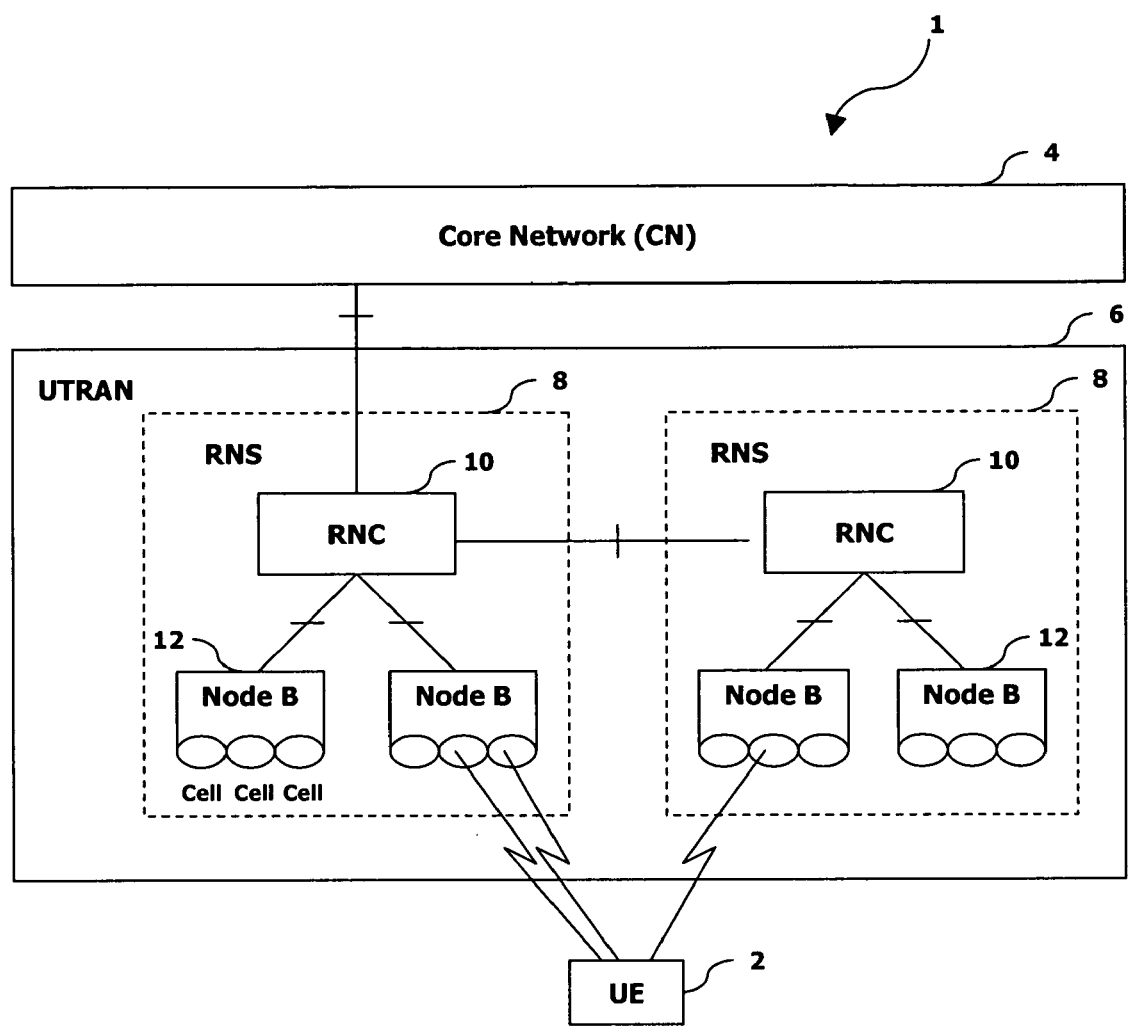
FIG. 1 illustrates a related art network structure of a wireless communication system.
Figure 2:
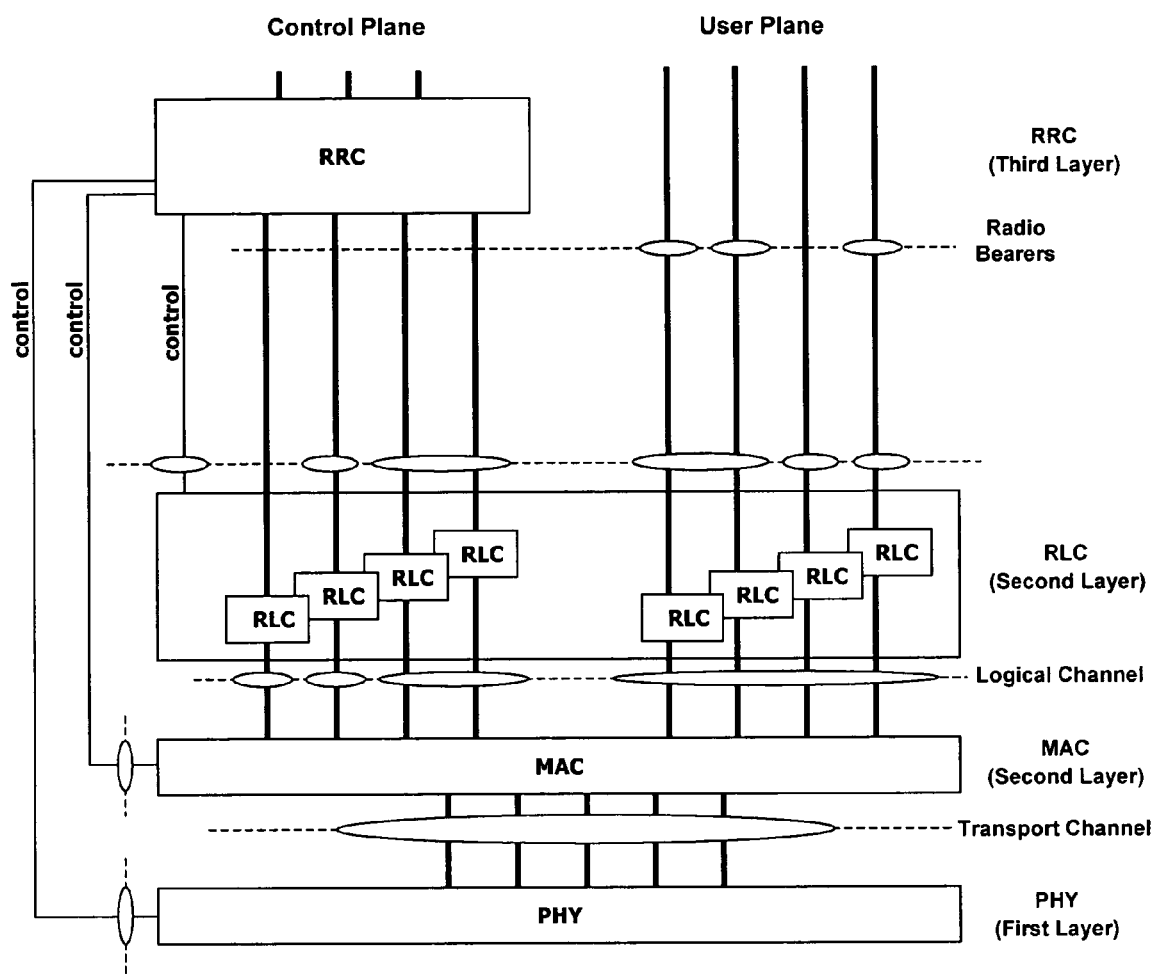
FIG. 2 illustrates a related art radio interface protocol architecture based on a radio access network specification between the UE and the UTRAN.
Figure 3:
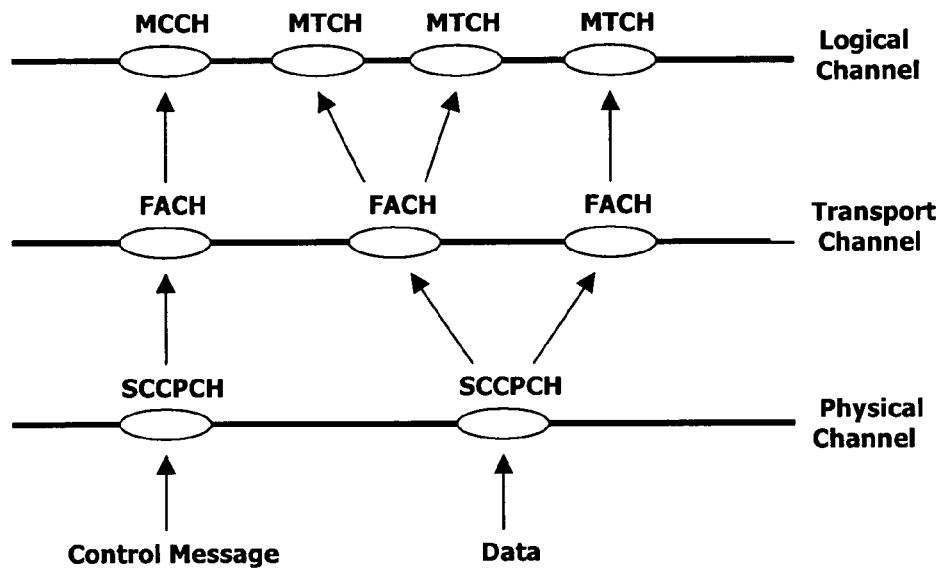
FIG. 3 illustrates related art channel mapping for an MBMS service for a mobile terminal.
Figure 4:
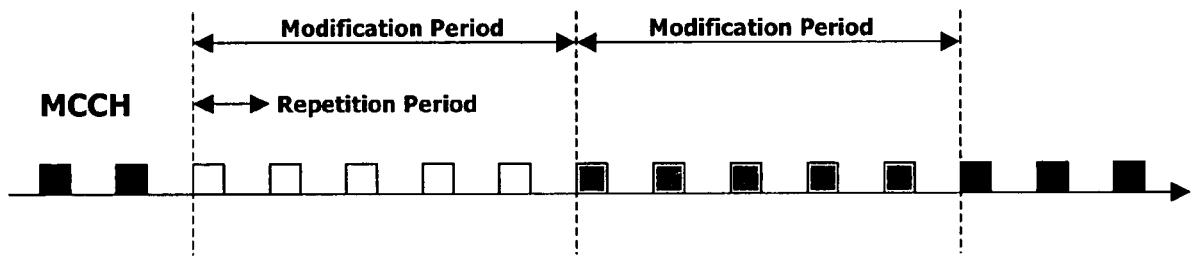
FIG. 4 illustrates a related art transmitting method of MCCH information.
Figure 5:
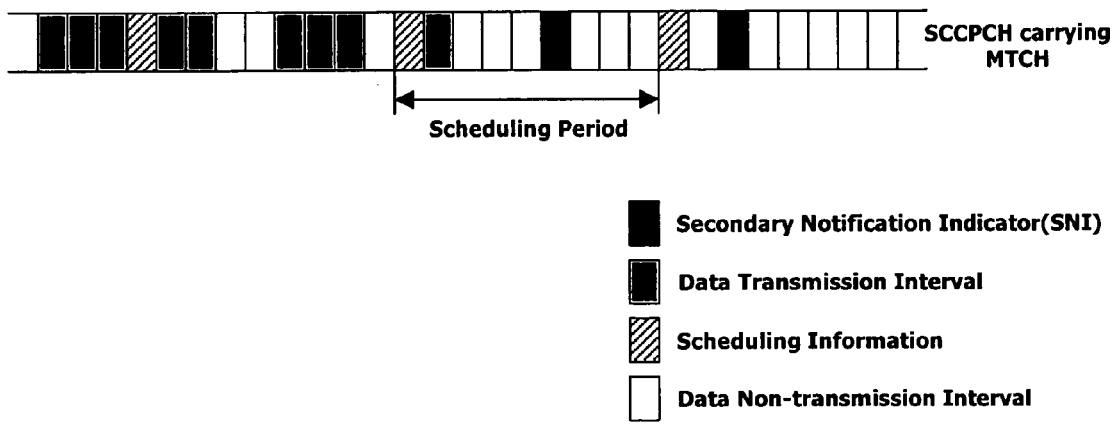
FIG. 5 illustrates a related art method of transmitting discontinuous MBMS data, scheduling information and a secondary notification indicator (SNI) through a physical channel.
Figure 6:
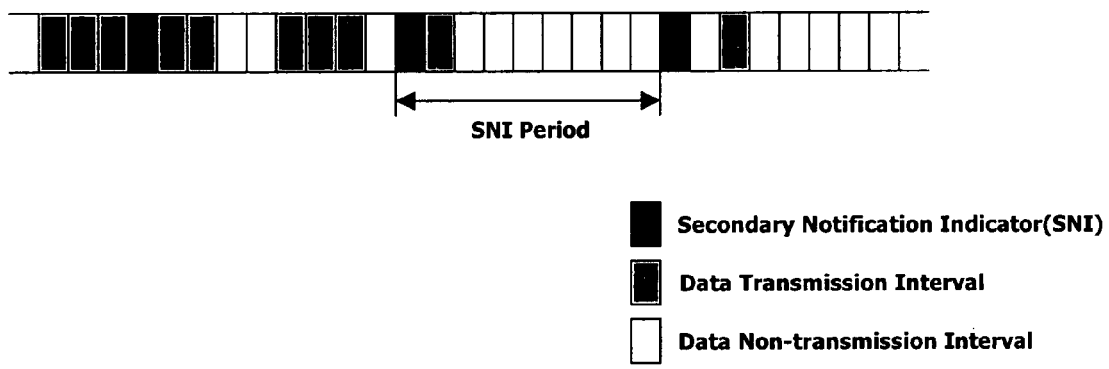
FIG. 6 illustrates a method for transmitting a notification indicator in accordance with one embodiment of the present invention.

FIG. 6 illustrates a method for transmitting a notification indicator in accordance with one embodiment of the present invention. As shown in FIG. 6, the notification indicator is transmitted once per a certain period. Here, the certain period is a notification indicator period. The notification indicator notifies whether control information for one or more MBMS services is to be modified, respectively. Therefore, the notification indicator includes an MBMS service ID and the modified contents of the control information. The notification indicator is transmitted through a logical channel MTCH, or through a logical channel S-MCCH, mapped together with an MTCH, to a physical channel SCCPCH.

Figure 7:
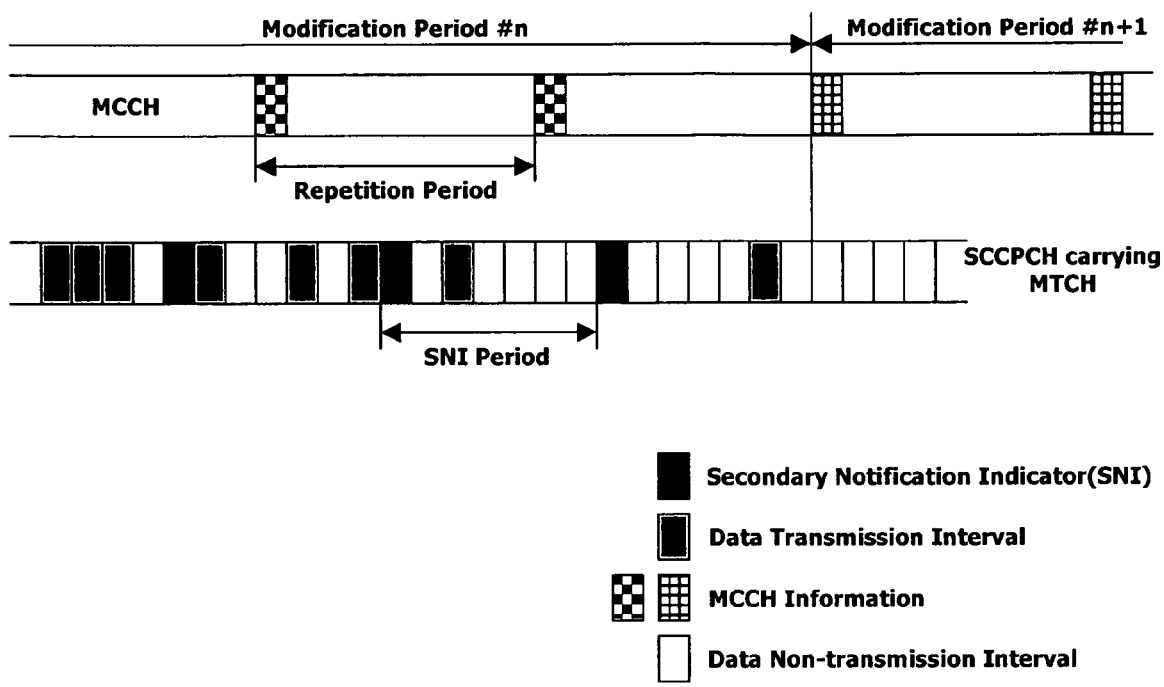
FIG. 7 illustrates a time correlation between a notification indicator transmission and an MCCH information transmission in accordance with one embodiment of the present invention.

FIG. 7 illustrates a time correlation between a notification indicator transmission and an MCCH information transmission. The MCCH transmits the MCCH information including MBMS control information based on a modification period and a repetition period. Notification indicators transmitted during a Modification Period #n inform the mobile terminal of whether the MCCH information to be transmitted during a subsequent Modification Period #n+1 is to be modified. Here, a physical channel through which the MCCH is transmitted may be different from a physical channel through which the MTCH is transmitted.

Still referring to FIG. 7, the mobile terminal receiving the SCCPCH mapped to the MTCH receives the notification indicator transmitted during the Modification Period #n. If the received notification indicator indicates that the MCCH information to be transmitted at the subsequent Modification Period #n+1 is to be modified, the mobile terminal receives the MCCH information transmitted during the Modification Period #n+1.

Figure 8:
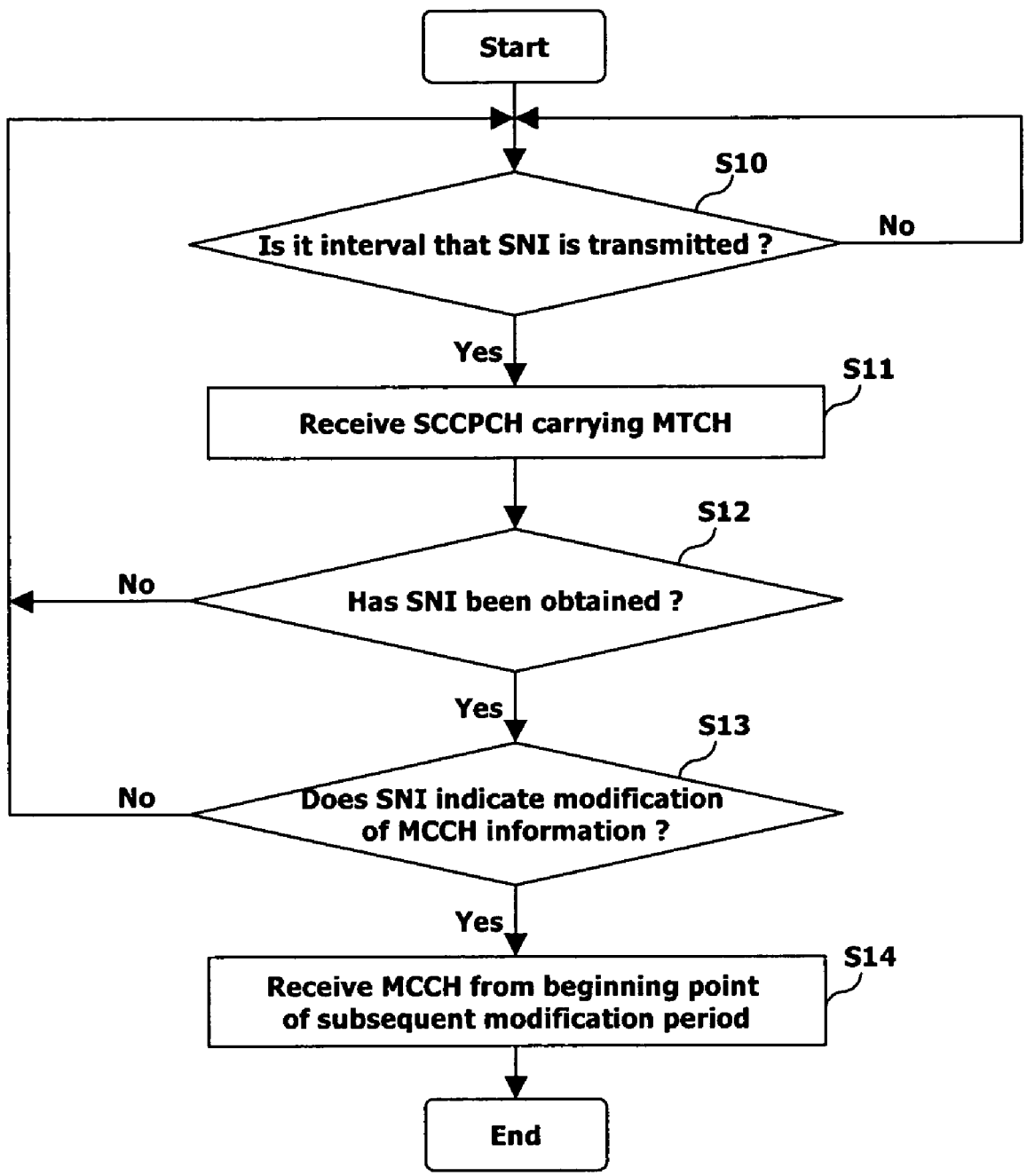
FIG. 8 illustrates an operation of a mobile terminal according to the time correlation between the notification indicator transmission and the MCCH information transmission in accordance with one embodiment of the present invention.

FIG. 8 illustrates a method of a mobile terminal depending on a time correlation between a notification indicator transmission and an MCCH information transmission. In the present invention, because the notification indicator is periodically transmitted, a UE RRC receives information about a notification indicator transmission period from a UTRAN RRC before receiving the notification indicator. Afterwards, first and second layers of the UE attempt a reception of the notification indicator once per notification indicator period according to an indication of the UE RRC.

When establishing an MTCH-mapped SCCPCH, the UE determines whether a reception-ongoing time interval is a time interval wherein the notification indicator is transmitted with respect to every transmission time interval (TTI) (step S10). If the reception-ongoing time interval is the time interval wherein the notification indicator is transmitted, the UE receives the SCCPCH during the time interval (step S11).

The UE identifies whether a data unit received at the time interval corresponds to the notification indicator or not (step S12). If it is identified that the received data unit is the notification indicator, namely, if the notification indicator is obtained, the UE checks whether the notification indicator indicates an MBMS service to which the UE has subscribed to (step S13). Preferably, the notification indicator includes one or more MBMS service IDs and information about whether to modify the MCCH information for each service. If the notification indicator includes the MBMS service ID to which the UE has subscribed to and indicates the modification of the MCCH information for the MBMS service, the UE identifies it as the notification indicator indicating the MBMS service to which the UE has subscribed.

If it is recognized that the notification indicator indicates the MBMS service to which the UE has subscribed to, the UE initiates receiving the MCCH from a beginning point of a subsequent modification period of the MCCH (step S14).

Figure 9:
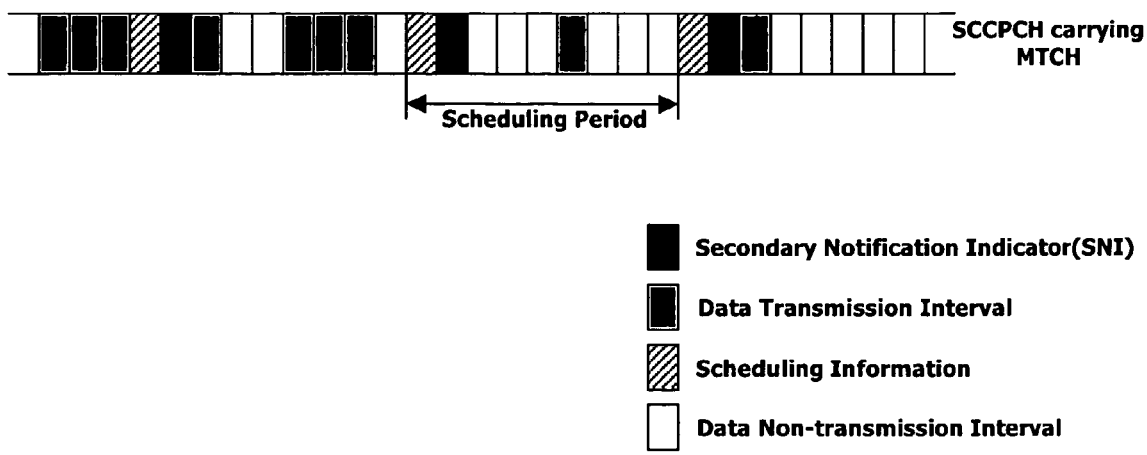
FIG. 9 illustrates a method of transmitting a notification indicator together with scheduling information in accordance with one embodiment of the present invention.

FIG. 9 illustrates transmitting a notification indicator together with scheduling information. The UTRAN can transmit scheduling information to a UE once per scheduling period. In order to simplify a receiving operation of the UE, the UTRAN may also transmit the notification indicator once per scheduling period. As shown in FIG. 9, the scheduling period is identical to the notification indicator period. Therefore, the UE can receive the scheduling information and the notification indicator according to one of the two periods. Preferably, the UE simply receives the scheduling information and the notification indicator when the UTRAN transmits the notification indicator before or after the scheduling information is transmitted. Thus, the UE initiates a reception of the notification indicator together with the scheduling information once per scheduling period. As a result, the UE may operate in accordance with the method of FIG. 8.

Figure 10:
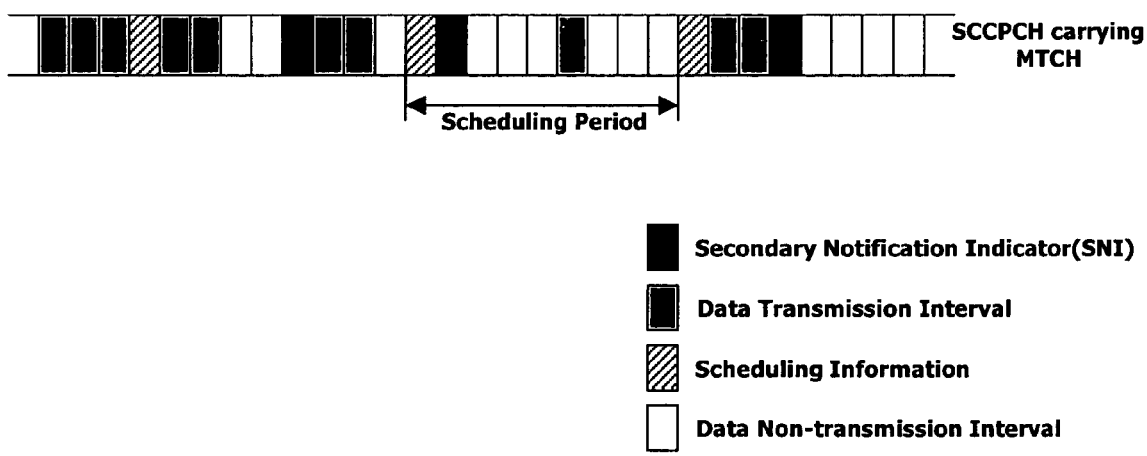
FIG. 10 illustrates another method of transmitting the notification indicator together with the scheduling information in accordance with one embodiment of the present invention.

FIG. 10 illustrates another example of transmitting the notification indicator together with the scheduling information. The scheduling information includes information about a transmission interval of the notification indicator transmitted within a corresponding scheduling period. Therefore, the notification indicator is transmitted according to the scheduling information. Here, a transmission point of the notification indicator within the scheduling period may not be constant.

Figure 11:
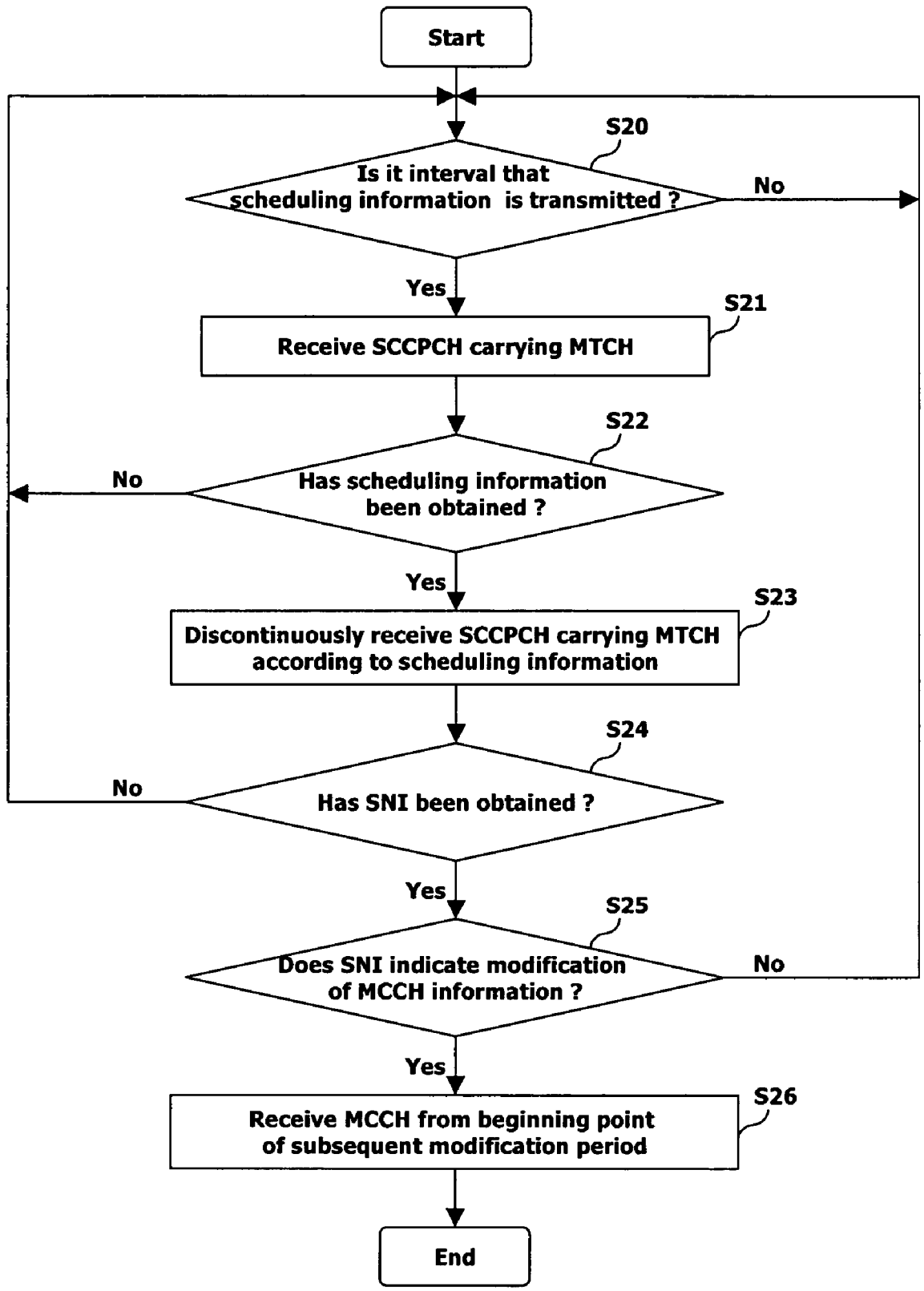
FIG. 11 illustrates an operation of a mobile terminal when transmitting the notification together with the scheduling information in accordance with one embodiment of the present invention.

FIG. 11 illustrates an operation of a UE when transmitting a notification indicator together with scheduling information. As aforementioned, the notification indicator is transmitted according to the scheduling information. Therefore, a UE RRC receives the scheduling information to obtain information about a notification indicator transmission period. Afterwards, first and second layers of the UE initiate a reception of the corresponding notification indicator every scheduling period according to an indication of the UE RRC.

When configuring the SCCPCH to which the MTCH is mapped, the UE determines whether a reception-ongoing time interval is a time interval in which the scheduling information is transmitted with respect to every transmission time interval (TTI) (step S20). If the reception-ongoing time interval is identified as the time interval that the scheduling information is transmitted, the UE receives the SCCPCH during the time interval (step S21).

The UE then identifies whether a data unit received during the time interval corresponds to the scheduling information (step S22). If the received data unit is recognized as the scheduling information, namely, if the scheduling information is obtained, the UE discontinuously receives the SCCPCH according to the obtained scheduling information (step S23).

Additionally, when the UE discontinuously receives the SCCPCH, it checks whether a data unit received from the SCCPCH corresponds to the notification indicator (step S24). If the received data unit is the notification indicator, namely, if the notification indicator is obtained, the UE identifies whether the notification indicator indicates a modification of MCCH information for an MBMS service to which the UE has subscribed (step S25). Namely, the notification indicator may include information about one or more MBMS service IDs and whether to modify the MCCH information for each service. Therefore, if the notification indicator includes the MBMS service ID to which the UE has subscribed to and indicates the modification of the MCCH information for the service, the UE identifies it as the notification indicator indicating the MBMS service to which the UE has subscribed.

If it is recognized that the notification indicator indicates the MBMS service to which the UE has subscribed, the UE initiates receiving the MCCH from a beginning point of a subsequent modification period of the MCCH (step S26).

Additionally, the notification indicator may include various information or messages for a specific MBMS service. For instance, the notification indicator may include release information of a point-to-multipoint radio bearer for a specific MBMS service or access information for the specific MBMS service. Once receiving the notification indicator including such information, the UE operates depending on the information included in the notification indicator. The UTRAN periodically transmits the notification indicator within one modification period repeatedly.

If the notification indicator received through the above methods indicates a release of the point-to-multipoint radio bearer for the specific MBMS service, the UE joined to the MBMS service releases the point-to-multipoint radio bearer therefrom. Also, if the notification indicator received through the above methods includes the access information for the specific MBMS service, the UE joined to the service attempts a transmission of an RRC connection request message on the uplink according to the access information.

As described so far, in the present invention, the network periodically transmits a notification message (notification indicator) for indicating an MCCH reception through a physical channel transmitting MBMS data. In response, the mobile terminal periodically checks the transmission of the notification message and determines whether to receive the MCCH. According to these methods, when the MBMS data is discontinuously transmitted, the UE can easily receive the notification message and also effectively receive the SCCPCH to which the MTCH is mapped.

Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMTS. The present invention is also applicable to other wireless communication systems using different air interfaces and/or physical layers, for example, TDMA, CDMA, FDMA, WCDMA, etc.

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

As the present invention may be embodied in several forms without departing from the spirit or essential characteristics thereof, it should also be understood that the above-described embodiments are not limited by any of the details of the foregoing description, unless otherwise specified, but rather should be constructed broadly within its spirit and scope as defined in the appended claims, and therefore all changes and modifications that fall within the metes and bounds of the claims, are equivalence of such metes and bounds are therefore intended to be embraced by the appended claims.

What is claimed is:

1. A method for receiving a point-to-multipoint service in a mobile terminal of a wireless communication system, the method comprising:
   receiving notification information from a network during a first period, wherein the notification information is received by a plurality of mobile terminals subscribing to at least one point-to-multipoint service;
   determining to receive a control channel during a second period for receiving a control information message according to the notification information; and
   receiving the control information message for the point-to-multipoint service during the second period if the mobile terminal determines to receive the control information message during the second period,
   wherein the notification information includes release information of a point-to-multipoint radio bearer for a specific point-to-multipoint service or access information for a specific point-to-multipoint service, and
   wherein the notification information is received via a first SCCPCH (secondary common control physical channel) and the control information message is received via a second SCCPCH.

2. The method of claim 1, wherein the notification information is periodically received during a specific time interval.

3. The method of claim 1, wherein the first period is a modification period and the second period is a subsequent modification period.

4. The method of claim 1, wherein the first SCCPCH and the second SCCPCH are the same SCCPCH.

5. The method of claim 1, wherein the step of determining to receive the control channel during the second period for receiving a control information message according to the notification information comprises determining whether the notification information indicates that a mobile terminal subscribing to the point-to-multipoint service should receive the control information message during the second period.

6. The method of claim 1, wherein the control channel is an MCCH (MBMS control channel).

7. The method of claim 1, wherein the control information message is received periodically.

8. The method of claim 1 wherein the first SCCPCH is an SCCPCH carrying an MTCH (MBMS traffic channel).

9. The method of claim 1, further comprising
   receiving scheduling information from the network for receiving the notification information.

10. The method of claim 9, wherein the scheduling information is received periodically.

11. The method of claim 9, wherein a reception point of the notification information within a scheduling period is not constant.

12. The method of claim 9, further comprising discontinuously receiving the first SCCPCH according to the scheduling information.

13. A method for transmitting a point-to-multipoint service from a network of a wireless communication system, the method comprising:
   transmitting notification information during a first period, wherein the notification information is provided to a plurality of mobile terminals subscribing to at least one point-to-multipoint service, the notification information comprising an indication for the reception of a control channel during a second period for receiving a control information message in a mobile terminal; and
   transmitting the control information message for the point-to-multipoint service during the second period,
   wherein the notification information includes release information of a point-to-multipoint radio bearer for a specific point-to-multipoint service or access information for a specific point-to-multipoint service, and
   wherein the notification information is transmitted via a first SCCPCH (secondary common control physical channel) and the control information message is transmitted via a second SCCPCH.

14. The method of claim 13, wherein the notification information is periodically transmitted during a specific time interval.

15. The method of claim 13, wherein the first period is a modification period and the second period is a subsequent modification period.

16. The method of claim 13, wherein the first SCCPCH and the second SCCPCH are the same SCCPCH.

17. The method of claim 13, wherein the control channel is an MCCH (MBMS control channel).

18. The method of claim 13, wherein the control information message is transmitted periodically.

19. The method of claim 13, wherein the first SCCPCH is an SCCPCH carrying an MTCH MBMS traffic channel).

20. The method of claim 13, further comprising:
   transmitting scheduling information to the mobile terminal for the reception of the notification information.

21. The method of claim 20, wherein the scheduling information is transmitted periodically.

22. The method of claim 20, wherein a transmission point of the notification information within a scheduling period is not constant.

23. The method of claim 20, further comprising discontinuously transmitting the first SCCPCH according to the scheduling information.

* * * * *